United States Patent
Iwasa et al.

(10) Patent No.: US 10,689,205 B2
(45) Date of Patent: Jun. 23, 2020

(54) PACKAGE ACCUMULATING DEVICE

(71) Applicant: ISHIDA CO., LTD., Kyoto-shi, Kyoto (JP)

(72) Inventors: Tatsuya Iwasa, Ritto (JP); Yuji Yokota, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/285,203

(22) Filed: Feb. 26, 2019

(65) Prior Publication Data
US 2019/0263600 A1    Aug. 29, 2019

(30) Foreign Application Priority Data

Feb. 27, 2018 (JP) .................................. 2018-33023

(51) Int. Cl.
*B65G 47/26* (2006.01)
*B65B 43/14* (2006.01)
(Continued)

(52) U.S. Cl.
CPC ............ *B65G 47/261* (2013.01); *B65B 5/024* (2013.01); *B65B 5/106* (2013.01); *B65B 7/20* (2013.01);
(Continued)

(58) Field of Classification Search
CPC ........ B65G 21/10; B65G 43/08; B65G 43/10; B65G 47/261; B65G 47/268;
(Continued)

(56) References Cited

U.S. PATENT DOCUMENTS 5,507,134 A * 4/1996 Takeda .................. B65G 43/08
                                                                             53/247
6,401,903 B1 * 6/2002 Berni .................. B65H 29/005
                                                                          198/370.01
(Continued)

FOREIGN PATENT DOCUMENTS

DE         602736 C * 9/1934 ............. B65G 47/29
DE         602736 C    9/1934
(Continued)

OTHER PUBLICATIONS

The Search Report from the corresponding European Patent Application No. 19159357.3 dated Jul. 10, 2019.

*Primary Examiner* — Gene O Crawford
*Assistant Examiner* — Keith R Campbell
(74) *Attorney, Agent, or Firm* — Shinjyu Global IP

(57) ABSTRACT

A package accumulating device is disclosed. The device conveys bag packages to a predetermined position while performing an accumulating operation that aligns the packages such that parts of each of the packages lie on top of parts of adjacent packages in a thickness direction. The device includes first and second conveyors, and a control unit. The first conveyor performs the accumulating operation. The second conveyor conveys a group of the packages aligned by the first conveyor. The control unit performs switching between a first state where a downstream end of the first conveyor and an upstream end of the second conveyor oppose each other when the second conveyor accepts the group of the packages from the first conveyor and a second state where a position of the upstream end of the second conveyor is lower than in the first state with respect to the downstream end of the first conveyor.

8 Claims, 8 Drawing Sheets

(51) Int. Cl.
*B65B 57/00* (2006.01)
*B65B 5/02* (2006.01)
*B65B 35/44* (2006.01)
*B65B 35/56* (2006.01)
*B65G 43/10* (2006.01)
*B65B 7/28* (2006.01)
*B65G 43/08* (2006.01)
*B65B 5/10* (2006.01)
*B65B 7/20* (2006.01)

(52) U.S. Cl.
CPC ............ *B65B 7/2864* (2013.01); *B65B 35/44* (2013.01); *B65B 35/56* (2013.01); *B65B 43/145* (2013.01); *B65B 57/00* (2013.01); *B65G 43/08* (2013.01); *B65G 43/10* (2013.01); *B65G 2201/0238* (2013.01)

(58) Field of Classification Search
CPC .......... B65G 47/647; B65G 2201/0238; B65B 5/024; B65B 5/106; B65B 7/20; B65B 7/2864; B65B 35/44; B65B 35/56; B65B 43/145; B65B 57/00
See application file for complete search history.

(56) References Cited

U.S. PATENT DOCUMENTS

| | | | |
|---|---|---|---|
| 8,292,061 B2 * | 10/2012 | Iwasa | B65B 5/061 |
| | | | 198/407 |
| 8,485,341 B2 * | 7/2013 | Woerz | B65G 47/086 |
| | | | 198/418.9 |
| 9,862,509 B2 * | 1/2018 | Arimatsu | B65B 35/44 |
| 2010/0170196 A1 | 7/2010 | Iwasa et al. | |

FOREIGN PATENT DOCUMENTS

| | | |
|---|---|---|
| DE | 102014202087 A1 | 8/2015 |
| EP | 2147881 A2 | 1/2010 |
| JP | 01252462 A * | 10/1989 |
| JP | H01-252462 A | 10/1989 |
| WO | 2012/165632 A1 | 12/2012 |

* cited by examiner

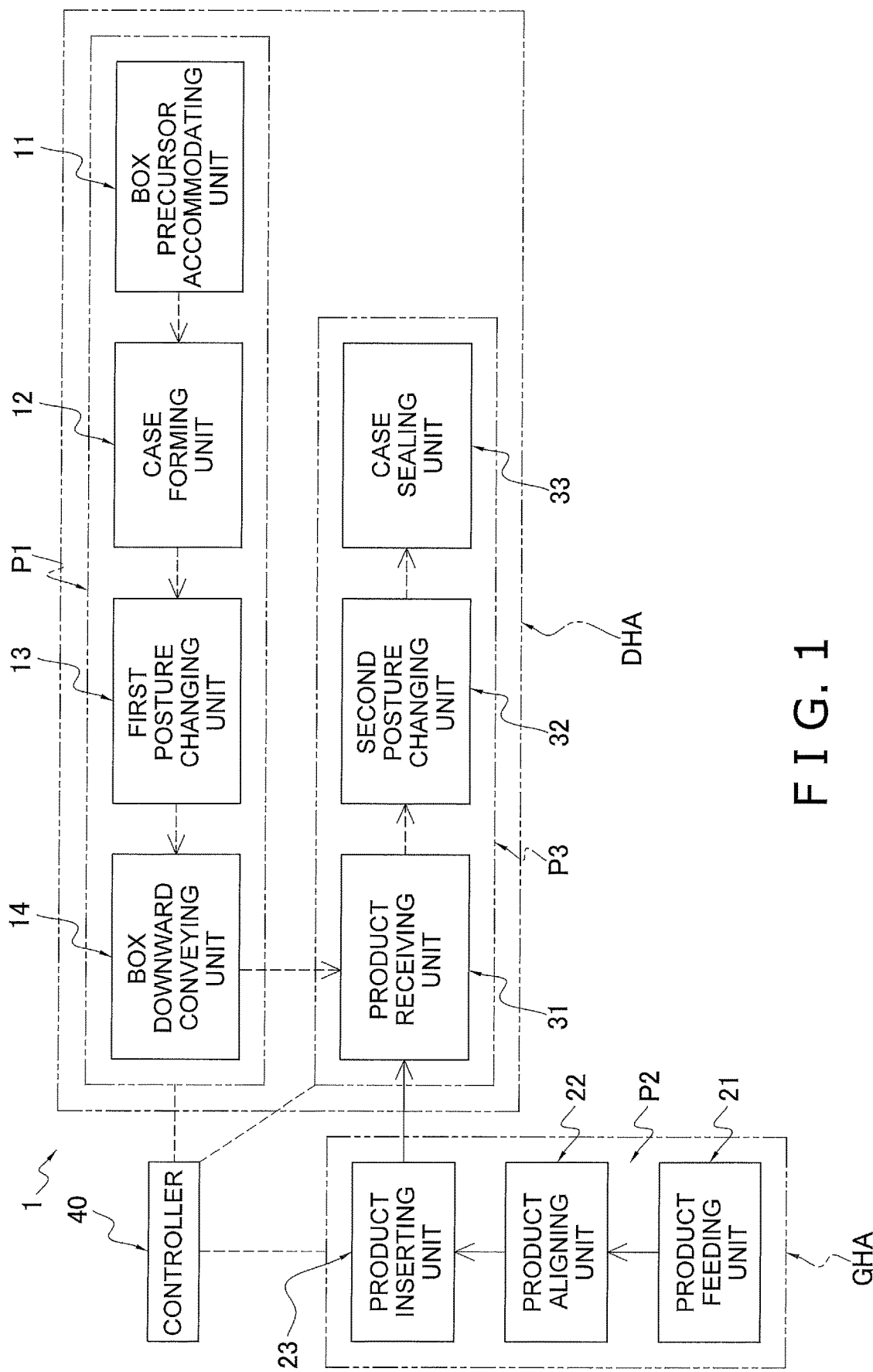
F I G. 1

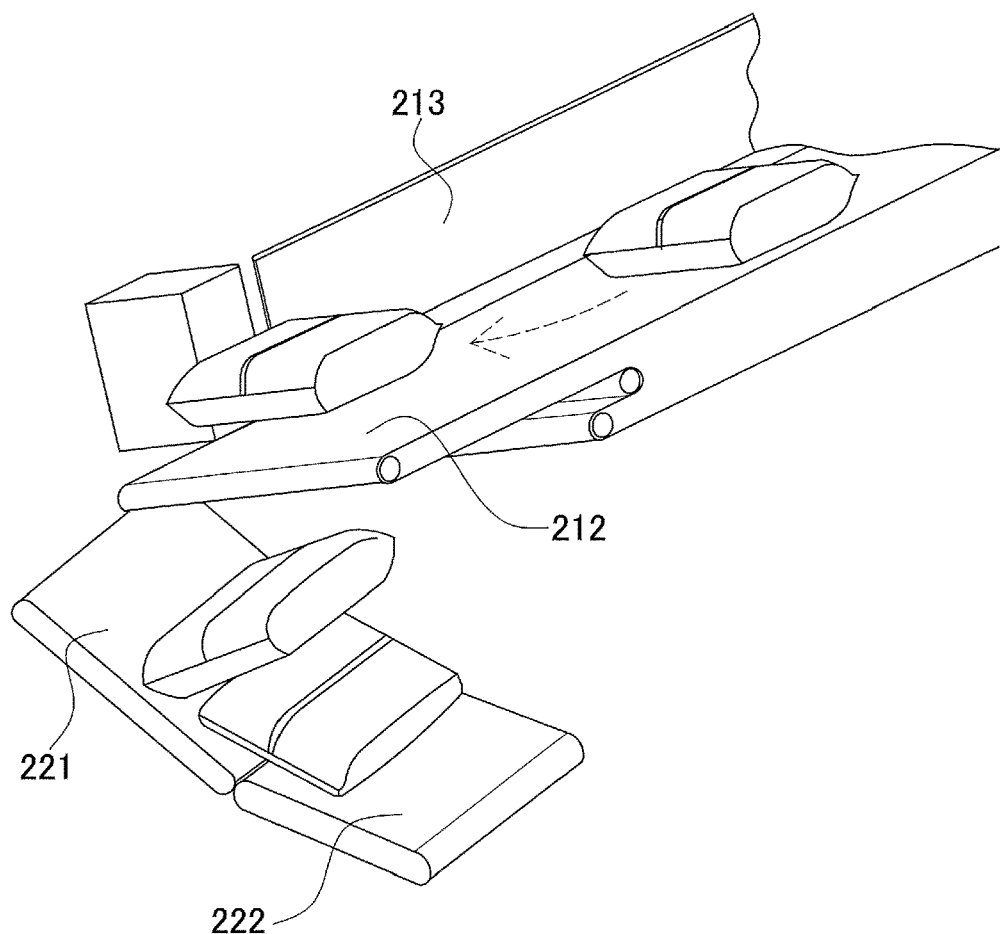
F I G. 3
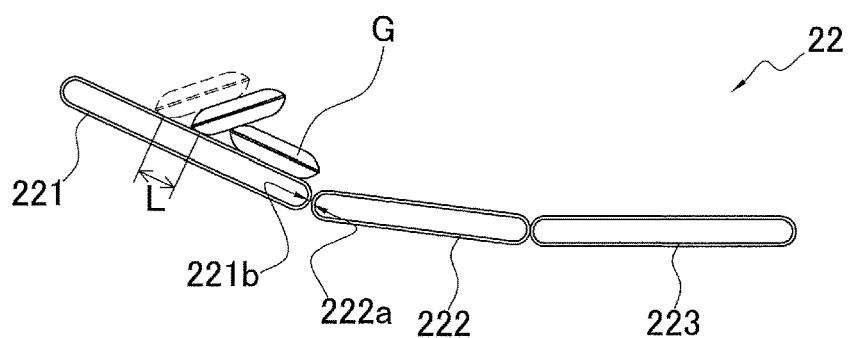
F I G. 4A

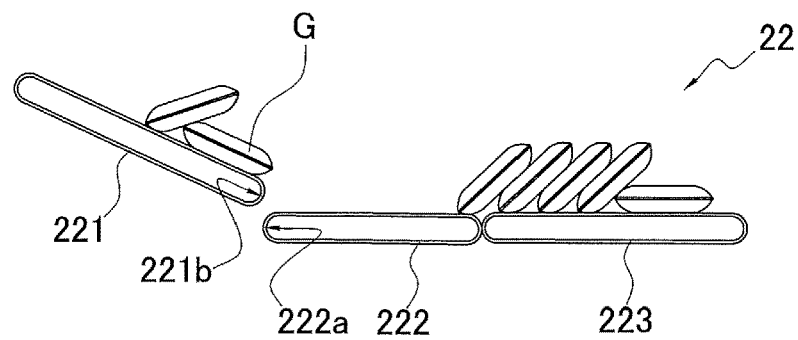
F I G. 4 F
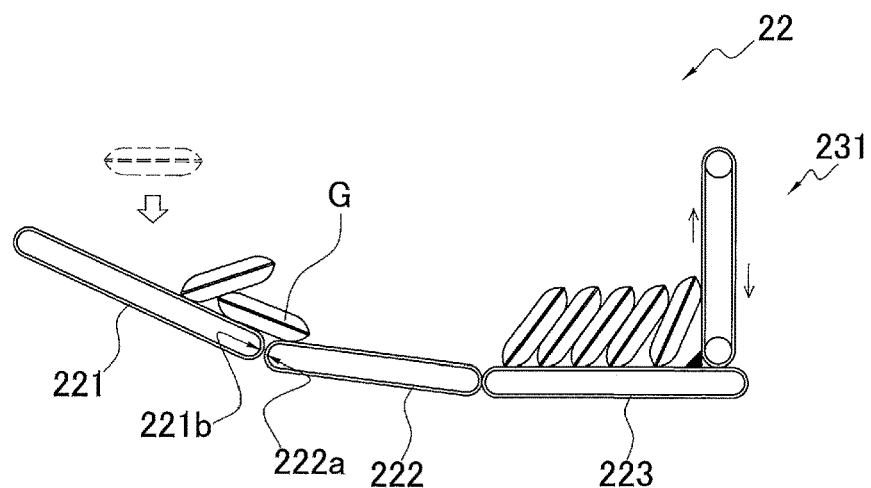
F I G. 4 G
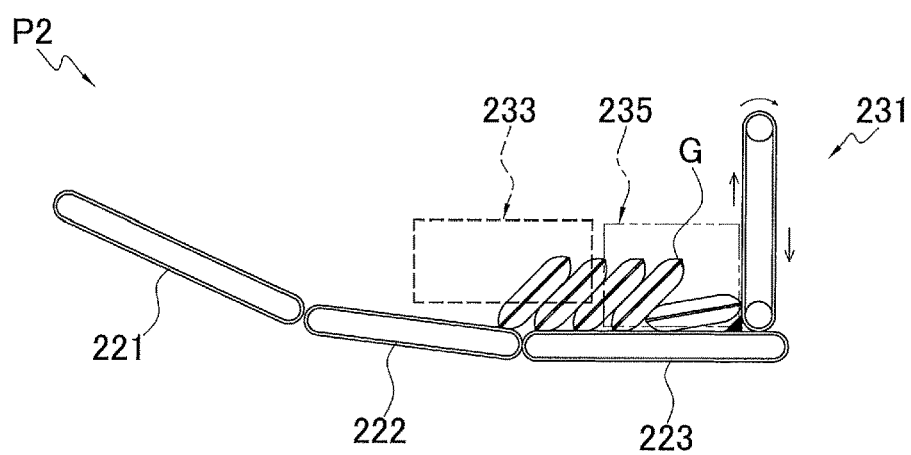
F I G. 5 A

PACKAGE ACCUMULATING DEVICE

CROSS-REFERENCE TO RELATED APPLICATIONS

This application claims priority to Japanese Patent Application No. 2018-33023, filed Feb. 27, 2018. The contents of that application are incorporated by reference herein in their entirety.

TECHNICAL FIELD

The present disclosure relates to a package accumulating device.

BACKGROUND ART

Conventionally, as a means of accumulating bag packages, a device is known which projects packages onto a conveyor and, while conveying the packages a fixed distance at a time, aligns the packages in such a way that the packages partially lie on top of each other. For example, WO 2012/165632 discloses a packing device that aligns plural bag packages to a state in which mutually adjacent packages partially overlap to thereby create a group in which a predetermined quantity of the packages are accumulated and conveys the group with conveying means so that the predetermined quantity of packages are together put into a predetermined box.

Groups of the packages are conveyed by a downstream conveyor to a predetermined position, but as a preceding group is being conveyed by the downstream conveyor, the next group of packages is being formed by an upstream conveyor.

BRIEF SUMMARY

However, if the bags of the packages are greater than a predetermined size, sometimes when the downstream conveyor is conveying the preceding group the package at the front of the next group of packages sticks out from the downstream end of the upstream conveyor, contacts the downstream conveyor, and ends up being pulled onto the downstream conveyor, so that the line of accumulation becomes disarranged.

It is a problem of the present disclosure to provide a package accumulating device that accumulates even packages with a large bag size without disarranging the line.

A package accumulating device pertaining to a first aspect of the disclosure conveys plural bag packages to a predetermined position while performing an accumulating operation that aligns the packages in such a way that parts of each of the packages lie on top of parts of adjacent packages in their thickness direction. The package accumulating device includes a first conveyor that performs the accumulating operation, a second conveyor that conveys a group of the packages aligned by the first conveyor, and a control unit. The control unit performs switching between a first state and a second state. The first state is a state in which a conveyance direction downstream end of the first conveyor and a conveyance direction upstream end of the second conveyor oppose each other when the second conveyor accepts the group of the packages from the first conveyor. The second state is a state in which the position of the upstream end of the second conveyor is lower than it is in the first state with respect to the downstream end of the first conveyor.

In this package accumulating device, the second state is a state in which the position of the upstream end of the second conveyor is lower than it is in the first state with respect to the downstream end of the first conveyor, so even if the package at the front of the next group of packages sticks out from the downstream end of the upstream conveyor, it is kept from contacting the conveyance direction upstream end of the second conveyor and is not pulled onto the downstream conveyor, and the line of accumulation is also inhibited from becoming disarranged.

A package accumulating device pertaining to a second aspect of the disclosure is the package accumulating device pertaining to the first aspect, wherein in the first state the conveyance surface of the first conveyor and the conveyance surface of the second conveyor form a substantially continuous conveyance surface. In the second state the conveyance surface of the second conveyor is lower than the downstream end of the first conveyor.

In this package accumulating device, in the second state the continuity between the downstream end of the first conveyor and the upstream end of the second conveyor is eliminated and the position of the upstream end of the second conveyor is lower than it is in the first state, so even if the package at the front of the next group of packages sticks out from the downstream end of the upstream conveyor, it is kept from contacting the conveyance direction upstream end of the second conveyor and is not pulled onto the second conveyor, and the line of accumulation is also inhibited from becoming disarranged.

A package accumulating device pertaining to a third aspect of the disclosure is the package accumulating device pertaining to the first aspect or the second aspect, wherein in the first state the conveyance surfaces of the first conveyor and the second conveyor are both inclined. In the second state the upstream end of the second conveyor is lowered so that the conveyance surface of the second conveyor becomes horizontal.

In this package accumulating device, in the second state, due to the upstream end of the second conveyor being lower, a package sticking out from the upstream end of the first conveyor does not contact the conveyance surface of the second conveyor as long as the center of gravity of the package remains on the conveyance surface of the first conveyor, so the package is not pulled onto the second conveyor, and the line of accumulation is also inhibited from becoming disarranged.

A package accumulating device pertaining to a fourth aspect of the disclosure is the package accumulating device pertaining to any one of the first aspect to the third aspect, further including a third conveyor that accepts and conveys the group of the packages from the second conveyor.

In this package accumulating device, even when the second conveyor and the final conveyance position of the group of the packages are located away from each other, the group of the packages can be conveyed to the final conveyance position via the third conveyor.

A package accumulating device pertaining to a fifth aspect of the disclosure is the package accumulating device pertaining to any one of the first aspect to the fourth aspect, wherein the control unit causes the first conveyor to perform the accumulating operation by moving the conveyance surface of the first conveyor by a predetermined amount each time the packages come onto the conveyance surface of the first conveyor.

In this package accumulating device, the packages following after the package at the front of the group lie on top of each other in the same inclined posture and align.

A package accumulating device pertaining to a sixth aspect of the disclosure is the package accumulating device pertaining to the fifth aspect, wherein when the last package of the group of the packages comes onto the conveyance surface of the first conveyor, the control unit moves the conveyance surface by an amount greater than the predetermined amount and simultaneously causes the second conveyor to operate.

In this package accumulating device, the last package of the group of the packages reliably moves from the conveyance surface of the first conveyor onto the conveyance surface of the second conveyor.

A package accumulating device pertaining to a seventh aspect of the disclosure is the package accumulating device pertaining to any one of the first aspect to the sixth aspect, wherein the control unit lowers the upstream end of the second conveyor after the last package of the group of the packages moves from the conveyance surface of the first conveyor onto the conveyance surface of the second conveyor.

In this package accumulating device, the upstream end of the second conveyor is lowered after the last package of the group of the packages moves from the conveyance surface of the first conveyor onto the conveyance surface of the second conveyor, so it is difficult for the line of the group to become disarranged.

A package accumulating device pertaining to an eighth aspect of the disclosure is the package accumulating device pertaining to any one of the first aspect to the seventh aspect, wherein the control unit decides whether or not to execute the switching to the second state depending on the bag size of the packages.

In this package accumulating device, in a case where the bag size is large, the package at the front of the next group sticks out from the downstream end of the first conveyor and contacts and becomes pulled onto the second conveyor that is conveying the preceding group, so switching to the second state in accordance with the bag size is sensical.

A package accumulating device pertaining to a ninth aspect of the disclosure is the package accumulating device pertaining to any one of the first aspect to the seventh aspect, wherein the control unit decides whether or not to execute the switching to the second state depending on the required production capacity.

In this package accumulating device, when the production speed is increased, formation of the "next group" is performed by the first conveyor while the second conveyor conveys the "preceding group," and it becomes easier for the package at the front of the "next group" to stick out from the downstream end of the first conveyor and contact and become pulled onto the second conveyor that is conveying the "preceding group." For that reason, switching to the second state depending on the required production capacity is sensical.

In the package accumulating device pertaining to the disclosure, the second state is a state in which the position of the upstream end of the second conveyor is lower than it is in the first state with respect to the downstream end of the first conveyor, so even if the package at the front of the next group of packages sticks out from the downstream end of the upstream conveyor, it is kept from contacting the conveyance direction upstream end of the second conveyor and is not pulled onto the downstream conveyor, and the line of accumulation is also inhibited from becoming disarranged.

BRIEF DESCRIPTION OF THE DRAWINGS

FIG. 1 is a block diagram of a packing system equipped with a case forming, packing, and sealing apparatus pertaining to an embodiment of the disclosure;

FIG. 3 is a perspective view showing the arrangement of a feeding conveyor, a first aligning conveyor, and a second aligning conveyor;

FIG. 5A is a front view of the region around the third aligning conveyor just before the aligned group of products is made to stand up;

DETAILED DESCRIPTION

An embodiment of the disclosure will be described below with reference to the drawings. It will be noted that the following embodiment is a specific example of the disclosure and is not intended to limit the technical scope of the disclosure.

(1) Configuration of Packing System 1

FIG. 1 is a block diagram of a packing system 1 equipped with a case forming, packing, and sealing apparatus pertaining to an embodiment of the disclosure. Furthermore, FIG. 2A is a perspective view showing the configuration of the packing system, and FIG. 2B is a perspective view showing a flow of cardboard boxes B and products G in the packing system 1.

Figure 2A:
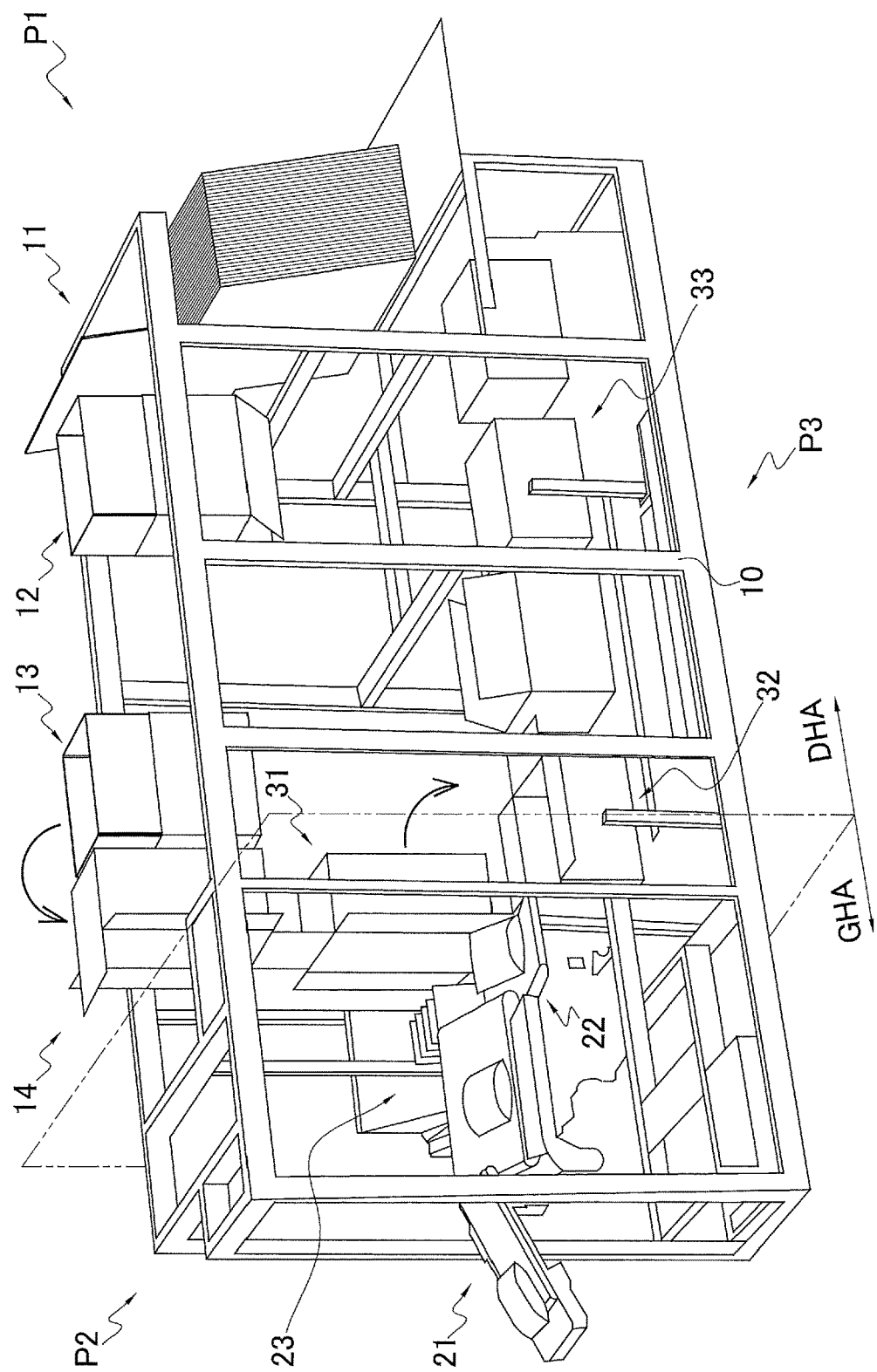
FIG. 2A is a perspective view showing the configuration of the packing system.
Figure 2B:
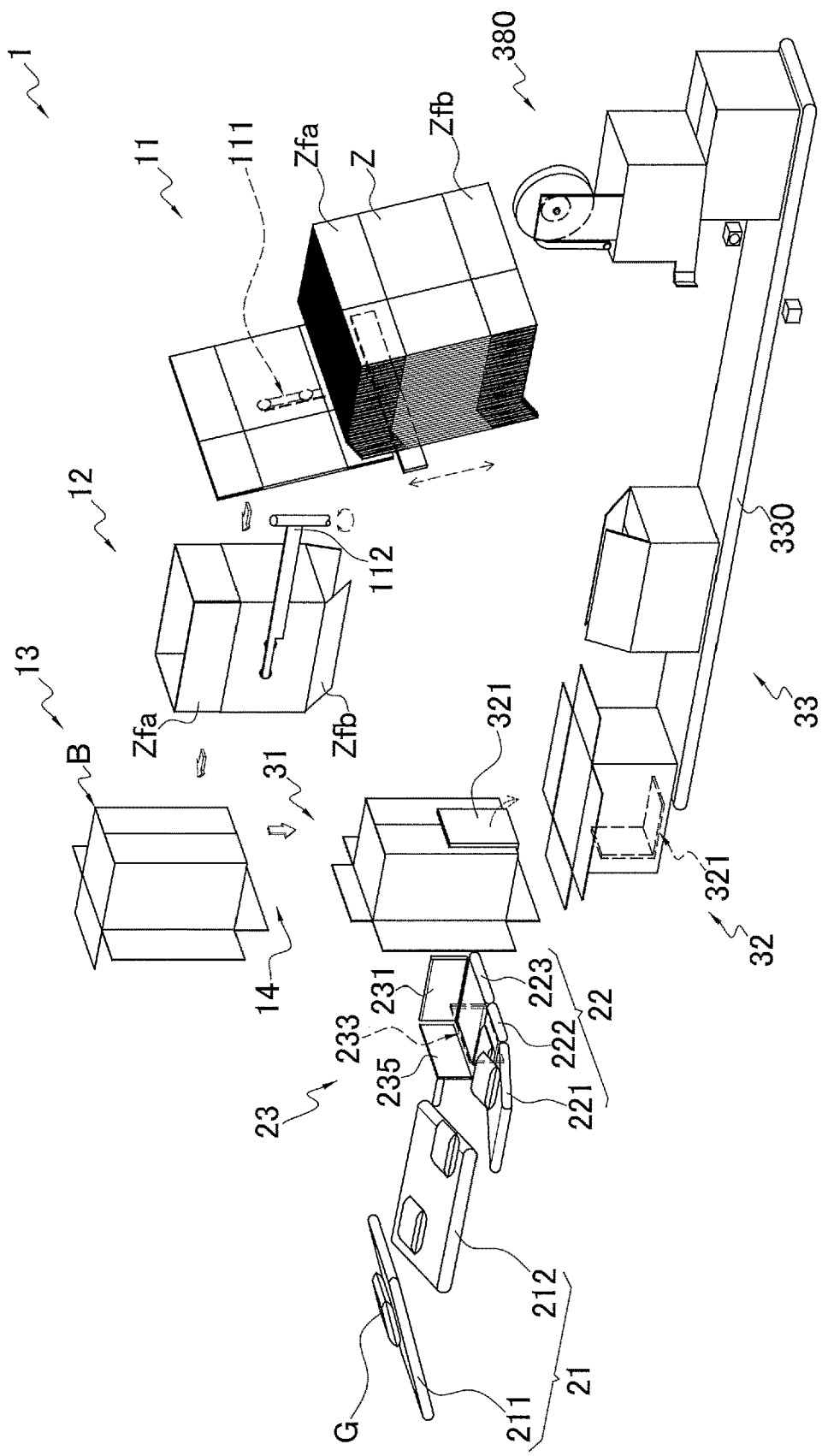
FIG. 2B is a perspective view showing a flow of cardboard boxes and products in the packing system.

In FIG. 1 and FIG. 2A, the packing system 1 is a system that packs a fixed number of bagged products (products G) such as snack foods, for example, in an aligned state and in multiple layers into cardboard boxes B.

As shown in FIG. 1 and FIG. 2A, the packing system 1 comprises a cardboard box handling area DHA and a product handling area GHA that are interconnected in a state in which they are mutually independently separable. The cardboard box handling area DHA includes two processes, a case forming process P1 and a packing process P3. The product handling area GHA includes a product aligning process P2.

That is, in the packing system 1, because the cardboard box handling area DHA and the product handling area GHA are interconnected, the three processes of the case forming process P1, the product aligning process P2, and the packing process P3 work together.

The case forming process P1 is a process of erecting sheet-like cardboard box precursors Z into cardboard boxes B and conveying the cardboard boxes B to a packing position. The case forming process P1 is configured by a box precursor accommodating unit 11, a case forming unit 12, a first posture changing unit 13, and a box downward conveying unit 14.

The product aligning process P2 is a process of feeding to a predetermined position the products G supplied from an upstream process, aligning a fixed number of the products G so that adjacent products partially lie on top of each other, and conveying the fixed number of products G to the packing position. The product aligning process P2 is configured by a product feeding unit 21, a product aligning unit 22, and a product inserting unit 23.

The packing process P3 is a process of packing, into the cardboard boxes B that have been conveyed thereto from the case forming process P1, the fixed quantity of products G that have finished being aligned in the product aligning process P2, closing the boxes, and conveying the boxes to a box discharge position. The packing process P3 is configured by a product receiving unit 31, a second posture changing unit 32, and a case sealing unit 33.

The packing system 1 performs multilayer packing of the products G into the cardboard boxes B, and the posture of the products G inside the boxes B is a "standing posture." That is, the standing posture is a posture where, when the openings of the boxes B face up, the front sides and the back sides of the products G face sideways, the upper and lower end portions of the products G face up and down, and the left and right side portions of the products G face sideways.

Furthermore, as shown in FIG. 2A and FIG. 2B, the cardboard box handling area DHA has a two-level structure, and the case forming process P1 and the packing process P3 are supported by a common frame 10. The case forming process P1 occupies the second-level portion, and the packing process P3 occupies the first-level portion.

In order to realize this two-level structure, the conveyance direction of the cardboard boxes B from the erection of the cardboard boxes B by the case forming unit 12 to the box downward conveying unit 14 and the conveyance direction of the cardboard boxes B up to when the openings of the cardboard boxes B that have been packed with the products G are sealed by the case sealing unit 33 are mutually opposite directions.

(2) Detailed Configuration of Case Forming Process P1

As shown in FIG. 2B, the case forming process P1 is configured by the box precursor accommodating unit 11 that introduces the cardboard box precursors Z to the packing system 1, the case forming unit 12 that erects the cardboard boxes B, the first posture changing unit 13 that rotates the cardboard boxes B 90° about a horizontal axis orthogonal to the conveyance direction, and the box downward conveying unit 14 that conveys downward the cardboard boxes B that have been switched to a first posture.

(2-1) Box Precursor Accommodating Unit 11

The box precursor accommodating unit 11, as shown in FIG. 2B, picks one at a time and transports upward the cardboard box precursor Z at the very front of the cardboard box precursors Z stacked in a supply position, rotates the transported cardboard box precursor Z 90° about a vertical axis, and opens it into a tubular shape.

The cardboard box precursors Z are placed in the supply position by a worker. The cardboard box precursors Z are collapsed with their flaps Zf open and are stacked in a horizontal direction in a posture in which the flaps Zf are positioned in the vertical direction. It will be noted that for convenience of description the flaps Zf on the top surface side will be called top flaps Zfa and the flaps Zf on the bottom surface side will be called bottom flaps Zfb.

The upward transport of the cardboard box precursors Z is performed by a lift mechanism 111. When all the cardboard box precursors Z in the supply position run out, a detection sensor (not shown in the drawings) sends a detection signal to a controller 40 (see FIG. 1).

Furthermore, the rotation of the cardboard box precursors Z about the vertical axis is realized by sucking and holding, with suckers, the side surfaces of the cardboard box precursors Z with a sucking and rotating mechanism 112 and rotating the sucking and rotating mechanism 112 90° about the vertical axis.

(2-2) Case Forming Unit 12

The case forming unit 12 conveys in a horizontal direction the cardboard box precursors Z that have been opened into a tubular shape and at the same time folds and tapes the bottom flaps Zfb of the cardboard box precursors Z to thereby erect the cardboard boxes B in a state in which the top flaps Zfa are open.

(2-3) First Posture Changing Unit 13

The first posture changing unit 13 rotates the cardboard boxes B 90° in the conveyance direction. More specifically, the first posture changing unit 13 rotates the cardboard boxes B 90° about a horizontal axis orthogonal to the conveyance direction to thereby change the posture of the cardboard boxes B to a posture (hereinafter called a first posture) in which the openings and the top flaps Zfa of the cardboard boxes B are in the same vertical plane. When the cardboard boxes B are in the first posture, the openings face the product handling area GHA.

(2-4) Box Downward Conveying Unit 14

The box downward conveying unit 14 conveys downward the cardboard boxes B that have been switched to the first posture. That is, the box downward conveying unit 14 moves the cardboard boxes B downward with the openings of the cardboard boxes B kept facing the product handling area GHA.

(3) Detailed Configuration of Product Aligning Process P2

Disposed upstream of the product aligning process P2 in terms of the flow of the products G in the packing system 1 are a weigher, a bag-making and packaging machine, and the like not shown in the drawings. Only products G that have passed, for example, weight, seal, and contamination inspections in the upstream process are supplied to the product aligning process P2 in the packing system 1.

The product aligning process P2 is configured by the product feeding unit 21 that accepts the products G and conveys them to a predetermined position, the product aligning unit 22 that aligns the products G supplied from the product feeding unit 21, and the product inserting unit 23 that accumulates and pushes out the aligned products G

(3-1) Product Feeding Unit 21

The product feeding unit 21 has a product introducing conveyor 211 and a feeding conveyor 212. The product introducing conveyor 211 receives, downstream of the process that performs, for example, the weight, seal, and contamination inspections, the supply of the products G that have passed the inspections and leads those products G to the feeding conveyor 212.

The feeding conveyor 212 conveys to the product aligning unit 22 the products G conveyed thereto from the product introducing conveyor 211.

FIG. 3 is a perspective view showing the arrangement of the feeding conveyor 212, a first aligning conveyor 221, and a second aligning conveyor 222. In FIG. 3, the conveyance surface of the feeding conveyor 212 is inclined with respect to a horizontal plane, and a support wall 213 that supports and prevents the products G from falling off and guides the products G in the conveyance direction is provided on the inclination direction lower side end of the conveyance surface. The products G that move on the inclination direction upper side of the conveyance surface receive a component force of the force of gravity along the inclination direction, so the products G slide down toward the support wall 213 while moving and thereafter move along the support wall 213.

(3-2) Product Aligning Unit 22

The product aligning unit 22 has the first aligning conveyor 221, the second aligning conveyor 222, and a third aligning conveyor 223. The product aligning unit 22 is a unit that conveys the products G to a predetermined position while performing an accumulating operation with respect to the products G The product aligning unit 22 is particularly suited to the accumulation of bag packages, so it can also be used independently as a package accumulating device.

(3-2-1) First Aligning Conveyor 221

The first aligning conveyor 221, in order to receive the products G that drop thereto from the feeding conveyor 212, has one end set in a lower position than the height of the distal end portion of the feeding conveyor 212 and has the other end set in the height position of the second aligning conveyor 222.

It will be noted that it is preferred that the distal end portion of the feeding conveyor 212 be positioned in the space directly above the product placement surface of the first aligning conveyor 221. Here, the product placement surface is the surface—of the conveyance surface of the first aligning conveyor 221—that waits to receive the products G that drop thereto.

Additionally, each time the first aligning conveyor 221 catches one product it conveys the product G a fixed distance (pitch L) toward the second aligning conveyor 222. This is because it is necessary to vacate the landing position before the next product G drops thereto because the position where the first aligning conveyor 221 catches the products G is the same. For that reason, the product G moves the fixed distance (pitch L) closer to the second aligning conveyor 222 from the position to which it dropped.

Part of the product G that drops thereafter lands on the first aligning conveyor 221, while the remaining part leans against the preceding product G and becomes inclined. This operation of aligning plural products Gin such a way that parts of each of the products G lie on top of parts of adjacent products G in their thickness direction is called an accumulating operation.

Figure 4:
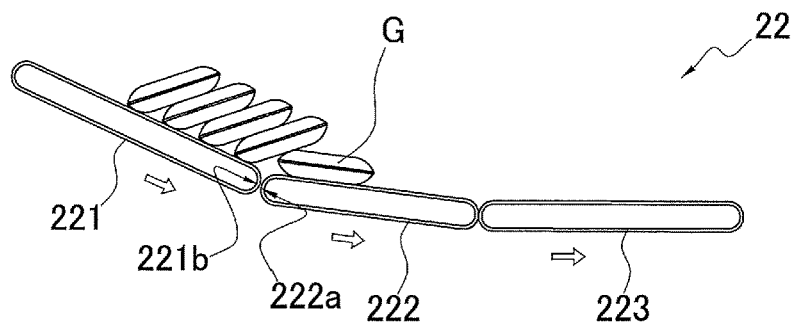
FIG. 4A is a front view of a product aligning unit as viewed from a horizontal direction orthogonal to a conveyance direction of a group of products in the middle of alignment on the first aligning conveyor.
FIG. 4B is a front view of the product aligning unit when a product at the front of the aligned group of products has moved onto the second aligning conveyor.
FIG. 4C is a front view of the product aligning unit after the aligned group of products has completely transferred to the second aligning conveyor.
FIG. 4D is a front view of the product aligning unit when the second aligning conveyor is in a second state.
FIG. 4E is a front view of the product aligning unit when the second aligning conveyor is in the second state.
FIG. 4F is a front view of the product aligning unit when the second aligning conveyor is in the second state.
FIG. 4G is a front view of the product aligning unit when the aligned group of products has been switched to a standing state on a third aligning conveyor.
Figure 4:
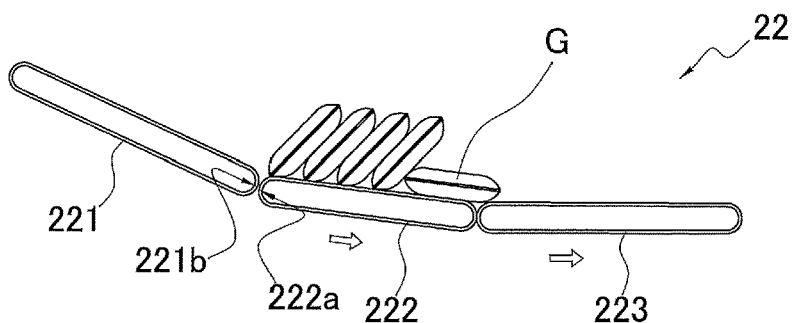
Figure 4:
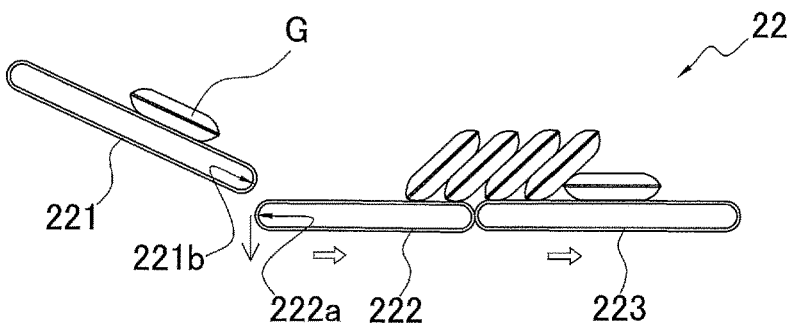
Figure 4:
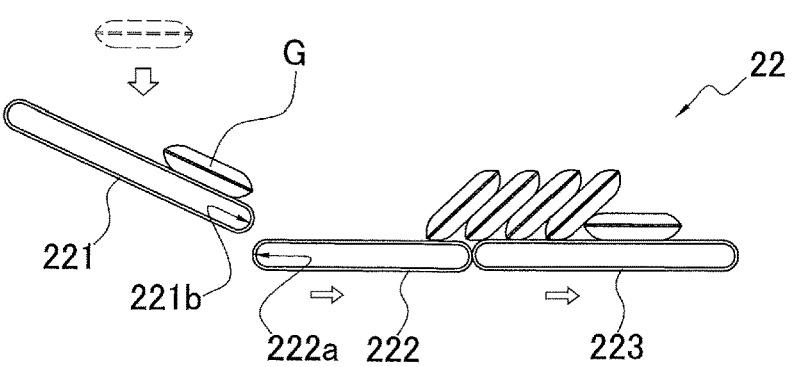

FIG. 4A is a front view of the product aligning unit 22. In FIG. 4A, the product G at the front that was dropped first on the first aligning conveyor 221 has a subsequent product G partially lying on top of it, and thereafter another subsequent product G comes to lie on top of that subsequent product G to form a line.

In a case where, for example, the product aligning unit 22 aligns N=5 products G as a group, the product G at the front is ahead a length of 4 L from the position where the product G at the rear lands, so in the present embodiment at least the product G at the front of the line arrives on the second aligning conveyor 222.

(3-2-2) Second Aligning Conveyor 222

FIG. 4B is a front view of the product aligning unit 22 when the product G at the front of the aligned groups of products G has moved onto the second aligning conveyor 222. In FIG. 4B, after the product G at the rear of the line lands on the first aligning conveyor 221, the first aligning conveyor 221, the second aligning conveyor 222, and the third aligning conveyor 223 simultaneously perform a conveying operation in the same direction. For that reason, the N-number of the products G aligned in a line on the first aligning conveyor 221 and the second aligning conveyor 222 move in unison toward the third aligning conveyor 223 and advance on the third aligning conveyor 223.

As shown in FIG. 4A and FIG. 4B, a conveyance direction downstream end 221b of the first aligning conveyor 221 and a conveyance direction upstream end 222a of the second aligning conveyor 222 oppose each other.

(3-2-2-1) First State of Second Aligning Conveyor 222

Here, the state in which the downstream end 221b of the first aligning conveyor 221 and the upstream end 222a of the second aligning conveyor 222 oppose each other is a state in which the downstream end 221b of the first aligning conveyor 221 and the upstream end 222a of the second aligning conveyor 222 are close enough to each other that the conveyance surface of the first aligning conveyor 221 and the conveyance surface of the second aligning conveyor 222 form a substantially continuous conveyance surface. This state is a first state.

In this first state, it is preferred that the gap between the downstream end 221b of the first aligning conveyor 221 and the upstream end 222a of the second aligning conveyor 222 be within 10 mm.

As shown in FIG. 4A and FIG. 4B, each time the first aligning conveyor 221 catches one product G, it repeats the operation of conveying that product G the fixed distance (pitch L) toward the second aligning conveyor 222, and when the last product G comes onto the first aligning conveyor 221, namely, when one line's worth of a group of products is reached, the first aligning conveyor 221 performs a conveying operation at a longer pitch than the fixed distance (pitch L) only at that time because the group of products G must be discharged from the first aligning conveyor 221. At the same time, the second aligning conveyor 222 and the third aligning conveyor 223 also perform a conveying operation at the same speed.

FIG. 4C is a front view of the product aligning unit 22 after the aligned group of products G has completely transferred to the second aligning conveyor 222. In FIG. 4C, just the first aligning conveyor 221, upon ending the longer pitch conveying operation, decelerates, stops, and prepares to catch the next group of products G At this time, the second aligning conveyor 222 and the third aligning conveyor 223 convey the group of products G handed over from the first aligning conveyor 221.

In a case where the products G are small bag products and many of them can be placed on the first aligning conveyor 221, or in a case where the conveyance speed is slow, the first state shown in FIG. 4A, FIG. 4B, and FIG. 4C is employed as the posture of the second aligning conveyor 222.

(3-2-2-2) Second State of Second Aligning Conveyor 222

However, in a case where the products G are large bag products and the conveyance speed is fast to increase production capacity and the second aligning conveyor 222 and the third aligning conveyor 223 perform a conveying operation except for when the products are inserted, there is the concern that when the second aligning conveyor 222 is conveying a preceding group of products the product at the front of the subsequent group of products will come into contact with the second aligning conveyor 222 and be pulled onto the second aligning conveyor 222.

Therefore, while the second aligning conveyor 22 is performing the conveying operation, the controller 40 switches the second aligning conveyor 222 to a second state, which is a state in which the position of the upstream end 222a of the second aligning conveyor 222 is lower than it is in the first state with respect to the downstream end 221b of the first aligning conveyor 221.

FIG. 4D, FIG. 4E, and FIG. 4F are front views of the product aligning unit 22 when the second aligning conveyor 222 is in the second state. In FIG. 4D, FIG. 4E, and FIG. 4F, a product G on the conveyance surface of the first aligning conveyor 221 is shown moving closer to the second aligning conveyor 222.

In FIG. 4D, FIG. 4E, and FIG. 4F, in the second state the upstream end 222a of the second aligning conveyor 222 is lowered in the direction of the arrow until the conveyance surface of the second aligning conveyor 222 is lower than the downstream end 221b of the first aligning conveyor 221.

In control terms, the controller 40 lowers the upstream end 222a of the second aligning conveyor 222 after the last product G of the group of products G has moved from the conveyance surface of the first aligning conveyor 221 onto the conveyance surface of the second aligning conveyor 222.

As shown in FIG. 4D to FIG. 4F, while the second aligning conveyor 222 is conveying a preceding group of products or even when a group of products G on the third aligning conveyor 223 is not yet standing up, the product G at the front of the subsequent group of products moves closer to the second aligning conveyor 222.

However, because the upstream end 222a of the second aligning conveyor 222 has been lowered, the product at the front of the subsequent group of products does not come into contact with the second aligning conveyor 222 and is not pulled onto the second aligning conveyor 222, and the line of accumulation of the group of products is also inhibited from becoming disarranged.

FIG. 4G is a front view of the product aligning unit 22 when the aligned group of products G has been switched to a standing state on the third aligning conveyor 223. In FIG. 4G a stand-up conveyor 231 whose conveyance surface moves in the vertical direction is disposed on the conveyance direction terminal end portion of the third aligning conveyor 223. It will be noted that in FIG. 4A to FIG. 4F illustration of the stand-up conveyor 231 is omitted for convenience of description.

After the group of products G has moved from the second aligning conveyor 222 onto the third aligning conveyor 223, the product G at the front stands up because of the conveyance surface of the stand-up conveyor 231 that moves in the vertical direction, and then the subsequent products G also stand up.

When the group of products G is in the standing state at the third aligning conveyor 223, products G are not present on the conveyance surface of the second aligning conveyor 222, and products G can be received from the first aligning conveyor 221. Moreover, the timing is such that on the first aligning conveyor 221 the product at the front of the next group of products G has moved closer to and is about to drop onto the second aligning conveyor 222. For that reason, the upstream end 222a of the second aligning conveyor 222 is raised so that the second aligning conveyor 222 switches to the first state and can support the product at the front of the group of products G The timing of this up/down operation of the second aligning conveyor 222 will be described in the section titled "(5) Control" in the latter part of this specification.

It will be noted that in the present embodiment, as shown in FIG. 4A, FIG. 4B, FIG. 4C, and FIG. 4G, in the first state the conveyance surfaces of the first aligning conveyor 221 and the second aligning conveyor 222 are both inclined. Additionally, as shown in FIG. 4D, FIG. 4E, and FIG. 4F, in the second state just the upstream end 222a of the second aligning conveyor 222 is lowered so that the conveyance surface of the second aligning conveyor 222 in the second state is substantially horizontal.

Furthermore, the controller 40 can decide whether or not to execute the switching to the second state depending on the size of the products G (e.g., the bag size) or can decide whether or not to execute the switching to the second state depending on the required production capacity.

(3-2-3) Third Aligning Conveyor 223

The third aligning conveyor 223 conveys, in front of the openings of the cardboard boxes B standing by, the group of products G aligned by the first aligning conveyor 221 and the second aligning conveyor 222. The third aligning conveyor 223 doubles as an element of the product inserting unit 23 described below.

(3-3) Product Inserting Unit 23

The product inserting unit 23 sandwiches the front and rear of the group of products G aligned in a line by the third aligning conveyor 223 and inserts the whole group of products G into the cardboard boxes B. As shown in FIG. 2B, the product inserting unit 23 has the stand-up conveyor 231, a push-toward plate 233, and an insertion plate 235 in order to sandwich the aligned group of products G

(3-3-1) Stand-up Conveyor 231

Figure 5B:
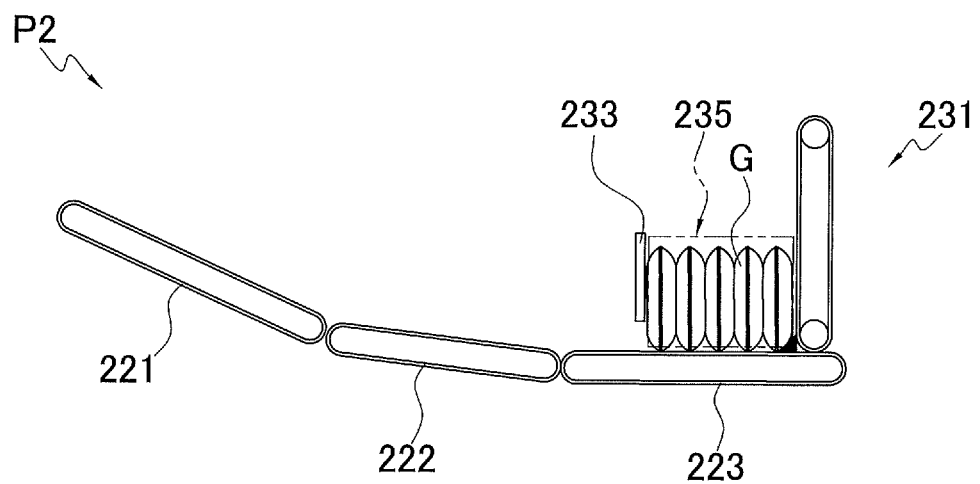
FIG. 5B is a front view of the region around the third aligning conveyor in a state in which the aligned group of products of FIG. 5A has been made to stand up.

The stand-up conveyor 231 is provided over the downstream end of the third aligning conveyor 223 and blocks the advance of the products G forming a line and being conveyed thereto. The stand-up conveyor 231 is disposed in such a way that its conveyance surface is always orthogonal to the conveyance direction of the products G FIG. 5A is a front view of the region around the third aligning conveyor 223 just before the aligned group of products G is made to stand up. Furthermore, FIG. 5B is a front view of the region around the third aligning conveyor 223 in a state in which the aligned group of products G of FIG. 5A has been made to stand up. In FIG. 5A and FIG. 5B, the conveyance surface of the stand-up conveyor 231 moves vertically upward a little before the products G come into contact with the conveyance surface of the stand-up conveyor 231. Then, when the leading end of the product G at the front comes into contact with the conveyance surface of the stand-up conveyor 231, an upward force acts on the leading end of the product and the horizontal movement of the product G by the third aligning conveyor 223 also continues, so the product G at the front can reliably stand up.

(3-3-2) Push-toward Plate 233

The push-toward plate 233 pushes the product at the rear of the N-number of products G aligned in a line to thereby sandwich the products G between itself and the stand-up conveyor 231 and cause the products G to stand up.

The push-toward plate 233 is provided on the upstream end side of the third aligning conveyor 223, but while the line of products G is moving from the second aligning conveyor 222 to the third aligning conveyor 223, the push-toward plate 233 is accommodated on the side of the third aligning conveyor 223 so that its flat surface portion is parallel to the conveyance direction of the products G Furthermore, when the product G at the rear of the line has completely transferred from the second aligning conveyor 222 to the third aligning conveyor 223, the push-toward plate 233 swings so that its flat surface portion becomes orthogonal to the conveyance direction of the products G Moreover, the push-toward plate 233 pushes the product G at the rear of the line to thereby push the entire line toward the stand-up conveyor 231.

At this time, the conveyance surface of the stand-up conveyor 231 is moving vertically upward, so the product G at the front of the line stands up along the conveyance surface of the stand-up conveyor 231, and the next product G stands up along the product G at the front that has been made to stand up. The subsequent products G also successively stand up because of the same operation, so the N-number of products G become aligned in a standing state.

Furthermore, the product inserting unit 23 collectively pushes, via the insertion plate 235, the N-number of products Gin the standing state into the cardboard boxes B. The insertion plate 235 is positioned on the opposite side of the position of the cardboard boxes B across the third aligning conveyor 223. When viewed from the second aligning conveyor 222 side, the open surfaces of the cardboard boxes B are positioned on the right side of the third aligning conveyor 223 and the insertion plate 235 is positioned on the left side of the third aligning conveyor 223.

(3-3-3) Insertion Plate 235

The insertion plate 235 stands by with its flat surface portion opposing the openings of the cardboard boxes B. After the N-number of products G have been switched to the standing state, the insertion plate 235 pushes the N-number of products G toward the open surfaces of the cardboard boxes B and in one fell swoop inserts the N-number of products G through the openings to the bottoms of the cardboard boxes B. The insertion plate 235 crosses between the stand-up conveyor 231 and the push-toward plate 233 and advances to the open surfaces of the cardboard boxes B.

(4) Detailed Configuration of Packing Process P3

The packing process P3 has the product receiving unit 31 that receives the products G into the cardboard boxes B, the second posture changing unit 32 that changes the posture of the cardboard boxes so that the openings of the cardboard boxes face up, and the case sealing unit 33 that conveys the cardboard boxes B that have finished being packed with the products G and at the same time closes the openings of the cardboard boxes B.

(4-1) Product Receiving Unit 31

The product receiving unit 31 maintains the cardboard boxes B in the first posture and has the cardboard boxes B stand by with the openings of the cardboard boxes B opposing the insertion plate 235 of the product inserting unit 23. The N-number of products G that have been switched to the standing state in the product inserting unit 23 are pushed out by the insertion plate 235 toward the open surfaces in the cardboard boxes B, so the product receiving unit 31 stands by in that position until the N-number of products G are completely inserted through the openings to the bottoms of the cardboard boxes B.

When a first layer of the N-number of products G is inserted into a cardboard box B, the product receiving unit 31 descends a predetermined distance. Then, in order to receive a second layer of the N-number of products the product receiving unit 31 has the cardboard box B stand by in such a way that the portion of the opening of the cardboard box B that leads to the space above the first layer opposes the insertion plate 235.

The product receiving unit 31 repeats the above-described operation so that an i-th layer of the N-number of products G is inserted into the cardboard box B, and the receiving of the products into the cardboard box B is finished.

(4-2) Second Posture Changing Unit 32

As shown in FIG. 2B, the second posture changing unit 32 has a posture changing mechanism 321 that changes the posture of the cardboard boxes B packed with the products G to a posture in which the openings face up.

The posture changing mechanism 321 rotates the cardboard boxes B so that the open surfaces that had been vertical until then become horizontal, namely, so that the open surfaces face up. The posture changing mechanism 321 uses an L-shaped member with suckers that simultaneously suck the side surface and the bottom surface of the cardboard boxes B to hold the cardboard boxes B, and when the L-shaped member rotates 90°, the cardboard boxes B rotate.

(4-3) Case Sealing Unit 33

When the cardboard boxes B have been rotated 90° by the posture changing mechanism 321, the cardboard boxes B are placed on the discharge conveyor 330 in a state in which the openings face up. The discharge conveyor 330 conveys the cardboard boxes B to the discharge position.

In the time until the cardboard boxes B are conveyed to the discharge position, the openings of the cardboard boxes B are closed as a result of the front flap Zfaa, the rear flap Zfab, the left flap Zfal, and the right flap Zfar being folded and are sealed by the tape applicator 380. The tape applicator 380 is installed near the discharge position on the conveyance path of the cardboard boxes B, and taping is performed before the cardboard boxes B reach the discharge position.

(5) Control of Raising and Lowering of Second Aligning Conveyor 222

Figure 6:
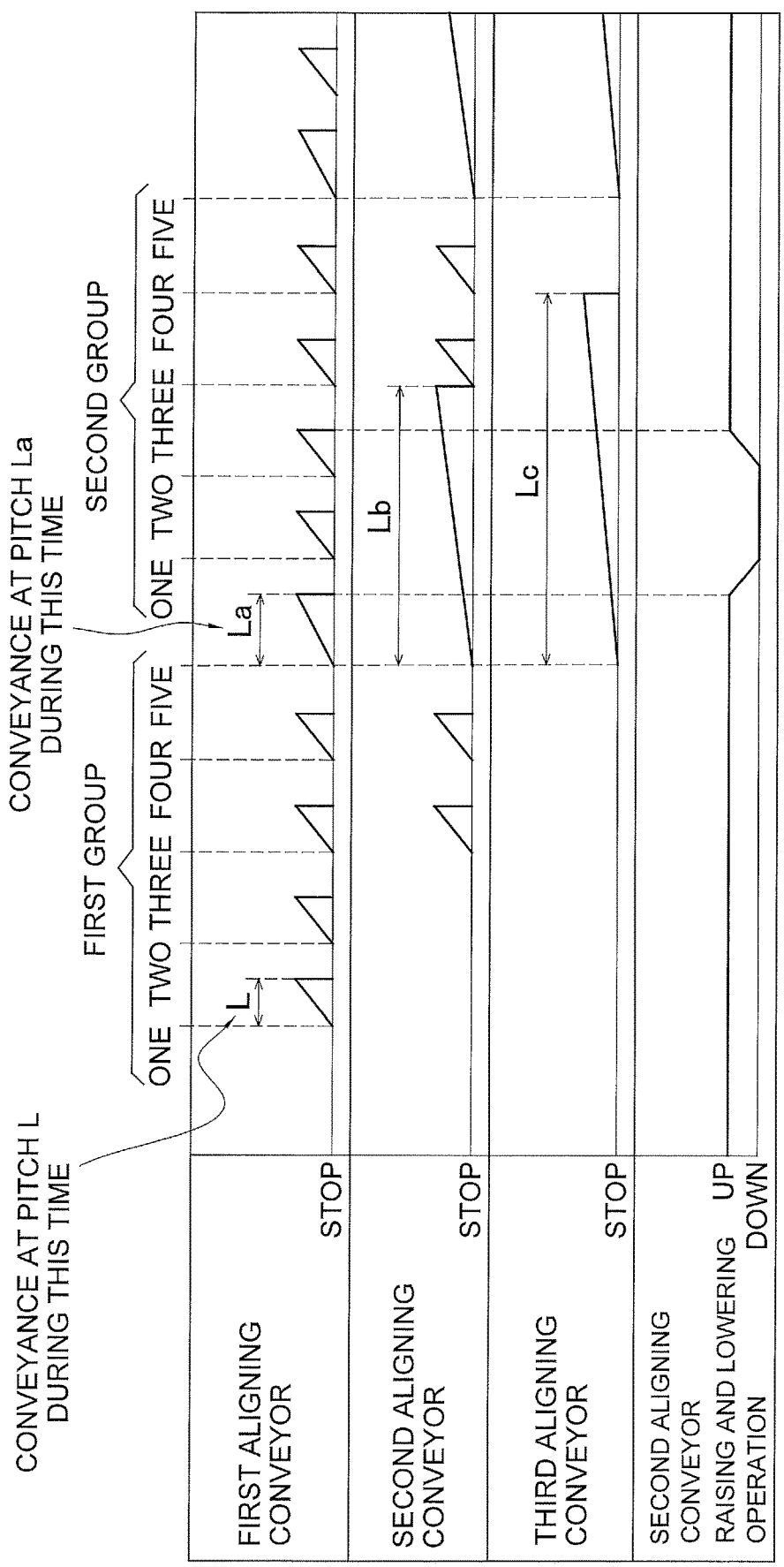
FIG. 6 is a timing chart showing the operations of the first aligning conveyor, the second aligning conveyor, and the third aligning conveyor.

FIG. 6 is a timing chart showing the operations of the first aligning conveyor 221, the second aligning conveyor 222, and the third aligning conveyor 223. Below, the timing when the second aligning conveyor 222 is raised and lowered will be described with reference to FIG. 4A to FIG. 4G and FIG. 6.

First, in FIG. 4A to FIG. 4C and FIG. 6, the first aligning conveyor 221 performs an intermittent conveyance at pitch L each time each one of the first to the fourth products G of a first group of products lands on the first aligning conveyor 221.

The second aligning conveyor 222 starts an intermittent operation at the same time as the third intermittent conveyance by the first aligning conveyor 221 when the third product G lands on the first aligning conveyor 221.

This is because, as shown in FIG. 4A, the product G that landed first on the first aligning conveyor 221 is starting to move onto the upstream end 222a of the second aligning conveyor 222, so by also causing the second aligning conveyor 222 to intermittently convey at pitch L at the same time, the product G is received onto the second aligning conveyor 222.

Consequently, at the time in point when the fourth product G lands on the first aligning conveyor 221 and there are a fourth intermittent conveyance by the first aligning conveyor 221 and a second intermittent conveyance by the second aligning conveyor 222, at least the product G at the front has moved onto the second aligning conveyor 222, and the third and fourth products G are on the first aligning conveyor 221.

Then, after the fifth product G lands on the first aligning conveyor 221, the first aligning conveyor 221 conveys at pitch La, which is greater than pitch L. This is a conveyance amount needed to transfer to the second aligning conveyor 222 the third and fourth products G that have already landed on the first aligning conveyor 221 and the fifth product G that has just landed.

After ending the intermittent conveyance at pitch La, the first aligning conveyor 221 receives a second group of products G and starts the intermittent conveyance at pitch L.

The second aligning conveyor 222 starts an intermittent conveying operation at a long pitch Lb at the same time as when the first aligning conveyor 221 starts the intermittent conveyance at pitch La. The upstream end 222a of the second aligning conveyor 222 is lowered in the middle of this intermittent operation at the long pitch Lb and at the same time as when the first aligning conveyor 221 ends the intermittent conveyance at pitch La (see FIG. 4D).

The reason the upstream end 222a of the second aligning conveyor 222 is lowered in this way is, the first product G of the second group that has already landed on the first aligning conveyor 221 is moving closer to the upstream end 222a of the second aligning conveyor 222, and if the upstream end 222a is not lowered the first product G of the second group will be pulled onto the second aligning conveyor 222 that is conveying the first group of products G Then, at the point in time when the second product G of the second group lands on the first aligning conveyor 221 and the intermittent conveyance at pitch L finishes, the first group of products G has been transferred from the second aligning conveyor 222 to the third aligning conveyor 223 and the first group of products G has been switched to the standing state by the stand-up conveyor 231 on the third aligning conveyor 223, so there are no products G on the second aligning conveyor 222, and the second aligning conveyor 222 can receive the second group of products G from the first aligning conveyor 221. For that reason, the upstream end 222a of the second aligning conveyor 222 is raised and returned to its original position (see FIG. 4G).

It will be noted that the intermittent conveyance at the long pitch Lb by the second aligning conveyor 222 finishes by the time the second product G of the second group lands on the first aligning conveyor 221 and the intermittent conveyance at pitch L finishes and the third product G lands.

The third aligning conveyor 223 starts an intermittent conveying operation at a long pitch Lc at the same time as when the first aligning conveyor 221 starts the intermittent conveyance at pitch La. The third aligning conveyor 223 finishes the intermittent conveyance at the long pitch Lc by the time the third product G of the second group lands on the first aligning conveyor 221 and the intermittent conveyance at pitch L finishes and the fourth product G lands.

During the time period of the intermittent conveyance at the long pitch Lc, the first to fifth products G of the first group finish aligning on the conveyance surface of the third aligning conveyor 223, and their insertion into the cardboard box B finishes.

(6) Characteristics of the Embodiment (6-1)

In the second aligning conveyor 222 of the packing system 1, the second state is a state in which the position of the upstream end 222a of the second aligning conveyor 222 is lower than it is in the first state with respect to the downstream end 221b of the first aligning conveyor 221, so even if the package at the front of the next group of packages sticks out from the downstream end 221b of the first aligning conveyor 221, it is kept from contacting the conveyance direction upstream end 222a of the second aligning conveyor 222 and is not pulled onto the second aligning conveyor 222, and the line of accumulation is also inhibited from becoming disarranged.

(6-2)

In the first state the conveyance surface of the first aligning conveyor 221 and the conveyance surface of the second aligning conveyor 222 form a substantially continuous conveyance surface, and in the second state the conveyance surface of the second aligning conveyor 222 is lower than the downstream end 221b of the first aligning conveyor 221. For that reason, in the second state the continuity between the downstream end 221b of the first aligning conveyor 221 and the upstream end 222a of the second aligning conveyor 222 is eliminated and the position of the upstream end 222a of the second aligning conveyor 222 is lower than it is in the first state, so even if the package at the front of the next group of packages sticks out from the downstream end 221b of the first aligning conveyor 221, it is kept from contacting the conveyance direction upstream end 222a of the second aligning conveyor 222 and is not pulled onto the second aligning conveyor 222, and the line of accumulation is also inhibited from becoming disarranged.

(6-3)

In the second state, due to the upstream end 222a of the second aligning conveyor 222 being lower, a package sticking out from the upstream end of the first aligning conveyor 221 does not contact the conveyance surface of the second aligning conveyor 222 as long as the center of gravity of the package remains on the conveyance surface of the first aligning conveyor 221, so the package is not pulled onto the second aligning conveyor 222, and the line of accumulation is also inhibited from becoming disarranged.

(6-4)

In the second aligning conveyor 222 of the packing system 1, even when the second aligning conveyor 222 and the final conveyance position of the group of packages are located away from each other, the group of packages can be conveyed to the final conveyance position via the third aligning conveyor 223.

(6-5)

The controller 40 causes the first aligning conveyor 221 to perform the accumulating operation by moving the conveyance surface by a predetermined amount (pitch L) each time the packages come onto the conveyance surface of the first aligning conveyor 221, so the packages following after the package at the front of the group lie on top of each other in the same inclined state and align.

(6-6)

When the last package of the group of the packages comes onto the conveyance surface of the first aligning conveyor 221, the controller 40 moves the conveyance surface by an amount greater than the predetermined amount and simultaneously causes the second aligning conveyor 222 to operate, so the last package of the group of the packages reliably moves from the conveyance surface of the first aligning conveyor 221 onto the conveyance surface of the second aligning conveyor 222.

(6-7)

The controller 40 lowers the upstream end 222a of the second aligning conveyor 222 after the last package of the group of the packages moves from the conveyance surface of the first aligning conveyor 221 onto the conveyance surface of the second aligning conveyor 222, so it is difficult for the line of the group to become disarranged.

(6-8)

In a case where the bag size is large, the package at the front of the next group sticks out from the downstream end 221b of the first aligning conveyor 221 and contacts and becomes pulled onto the second aligning conveyor 222 that is conveying the preceding group, so the controller 40 decides whether or not to execute the switching to the second state depending on the bag size of the packages.

(6-9)

When the production speed is increased, formation of the "next group" is performed by the first aligning conveyor 221 while the second aligning conveyor 222 conveys the "preceding group," and it becomes easier for the package at the front of the "next group" to stick out from the downstream end 221b of the first aligning conveyor 221 and contact and become pulled onto the second aligning conveyor 222 that is conveying the "preceding group," so the controller 40 decides whether or not to execute the switching to the second state depending on the required production capacity.

REFERENCE SIGNS LIST

40 Controller
221 First Aligning Conveyor
221b Downstream End
222 Second Aligning Conveyor
222a Upstream End
223 Third Aligning Conveyor
G Products (Packages)

What is claimed is:

1. A package accumulating device that conveys plural bag packages to a predetermined position while performing an accumulating operation that aligns the packages such that parts of each of the packages lie on top of parts of adjacent packages in a thickness direction and packs the packages in a cardboard box, the package accumulating device comprising:
    a first conveyor that performs the accumulating operation, the first conveyor having a first conveyance surface for accumulating the packages;
    a second conveyor that receives and further conveys a group of the packages conveyed from the first conveyance surface of the first conveyor; and
    a control unit that performs switching between
        a first state in which a downstream end of the first conveyance surface of the first conveyor in a conveyance direction and an upstream end of a second conveyance surface of the second conveyor in the conveyance direction oppose each other when the second conveyor accepts the group of the packages from the first conveyance surface of the first conveyor and
        a second state in which the second conveyance surface of the second conveyor is departed from the first conveyance surface of the first conveyor such that a position of the upstream end of the second conveyance surface of the second conveyor is lower than the position of the upstream end of the second conveyance surface of the second conveyor in the first state with respect to the downstream end of the first conveyance surface of the f first conveyor, wherein
    the control unit lowers the upstream end of the second conveyance surface of the second conveyor after a last package of the group of the packages moves from the first conveyance surface of the first conveyor onto the second conveyance surface of the second conveyor, and
    the control unit further causes the first conveyor
        to perform the accumulating operation for a next group of the packages on the first conveyance surface of the first conveyor which has conveyed the group of the packages onto the second conveyor and to perform the accumulating operation of the packages on the first conveyance surface of the first conveyor both in the first state and the second state.

2. The package accumulating device according to claim 1, wherein in the first state, the first conveyance surface of the first conveyor and the second conveyance surface of the second conveyor form a substantially continuous conveyance surface, and in the second state, the second conveyance surface of the second conveyor is lower than the downstream end of the first conveyance surface of the first conveyor.

3. The package accumulating device according to claim 1, wherein in the first state, the first conveyance surface of the first conveyor and the second conveyance surface of the second conveyor are both inclined, and in the second state, the upstream end of the second conveyance surface of the second conveyor is lowered so that the second conveyance surface of the second conveyor becomes horizontal.

4. The package accumulating device according to claim 1, further comprising a third conveyor that accepts and conveys the group of the packages from the second conveyor.

5. The package accumulating device according to claim 1, wherein the control unit causes the first conveyor to perform the accumulating operation by moving the first conveyance surface of the first conveyor by a predetermined amount each time the packages come onto the first conveyance surface of the first conveyor.

6. The package accumulating device according to claim 5, wherein when a last package of the group of the packages comes onto the first conveyance surface of the first conveyor, the control unit moves the first conveyance surface by an amount greater than the predetermined amount and simultaneously causes the second conveyor to operate.

7. The package accumulating device according to claim 1, wherein the control unit decides whether or not to execute the switching to the second state depending on a size of the packages.

8. The package accumulating device according to claim 1, wherein the control unit decides whether or not to execute the switching to the second state depending on a required production capacity.

\* \* \* \* \*